(12) United States Patent
Ban et al.

(10) Patent No.: US 7,657,346 B2
(45) Date of Patent: Feb. 2, 2010

(54) OBJECT PICKING SYSTEM

(75) Inventors: Kazunori Ban, Yamanashi (JP); Ichiro Kanno, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 776 days.

(21) Appl. No.: 11/111,722

(22) Filed: Apr. 22, 2005

(65) Prior Publication Data
US 2006/0104788 A1 May 18, 2006

(30) Foreign Application Priority Data
Apr. 23, 2004 (JP) ............... 2004-128171

(51) Int. Cl.
*B25J 15/02* (2006.01)
*B25J 19/04* (2006.01)
*G05B 19/00* (2006.01)

(52) U.S. Cl. ............. 700/262; 700/250; 700/253; 318/568.16; 318/568.21; 901/47

(58) Field of Classification Search ........... 414/416.01, 414/729, 796.1, 796.3, 797.4, 797.8, 751.1, 414/768, 772, 783, 207, 381; 901/7, 9, 47; 700/249, 262, 259, 250, 253; 348/91, 92; 318/568.16, 568.21

See application file for complete search history.

(56) References Cited

U.S. PATENT DOCUMENTS 4,790,709 A * 12/1988 Sakimori et al. ....... 414/416.01
5,446,835 A * 8/1995 Iida et al. ................ 700/259
6,597,971 B2 * 7/2003 Kanno .................... 700/245
6,721,444 B1 * 4/2004 Gu et al. .................. 382/154
2004/0019405 A1 * 1/2004 Ban et al. ................ 700/213

FOREIGN PATENT DOCUMENTS

| EP | 0 951 968 | 10/1999 |
|---|---|---|
| EP | 1 385 122 | 1/2004 |
| EP | 1 442 848 | 8/2004 |
| JP | 9-091441 | 4/1997 |
| JP | 2004-094374 | 4/2000 |
| JP | 2001-205584 | 7/2001 |
| JP | 2002-154656 | 5/2002 |
| JP | 2003-034432 | 2/2003 |

* cited by examiner

*Primary Examiner*—Thomas G Black
*Assistant Examiner*—Christine M Behncke
(74) *Attorney, Agent, or Firm*—Drinker Biddle & Reath LLP (57) ABSTRACT

The system includes a detecting section detecting an object to be picked, among a plurality of objects placed in a manner as to be at least partially superimposed on each other; a storage section storing appearance information of a predetermined portion of a reference object having an outward appearance identical to an outward appearance of the object to be picked; a determining section determining whether an inspected portion of the object to be picked, corresponding to the predetermined portion of the reference object, is concealed by another object, based on the appearance information of the reference object stored in the storage section; a control section deciding a picking motion for the object to be picked and outputting a control signal of the picking motion; and a picking mechanism performing the picking motion on the object to be picked in accordance with the control signal output from the control section.

5 Claims, 7 Drawing Sheets

| DETECTION POINT | POSITION | ROTATION |
|---|---|---|
| P0 | (Vt0, Hz0) | $\theta 0$ |
| P1 | (Vt1, Hz1) | $\theta 1$ |
| P2 | (Vt2, Hz2) | $\theta 2$ |

OBJECT PICKING SYSTEM

BACKGROUND OF THE INVENTION

1. Field of the Invention

The present invention relates to an object picking system for picking up, one by one, a plurality of objects. The present invention may be used, for example, in an operation of picking workpieces, irregularly accommodated in a container or the like in a factory, one by one from the container.

2. Description of the Related Art

In a case where, in a production line in a factory for example, a multiplicity of workpieces are placed in a container in an irregular and random arrangement, it is advantageous in view of labor saving that the workpieces are individually picked up safely and reliably while their configuration is not substantially changed. It is conventionally known to carry out such an operation of picking up workpieces by using a robot system provided with a visual sensor for detecting the position, orientation, etc., of the workpieces. In a case where the robot system is used to carry out the picking-up operation on workpieces arranged irregularly in a container, it is possible, if there is no other workpiece superimposed on or overlapping with a workpiece required to be picked up (hereinafter referred to as a "workpiece to be picked"), to control a robot mechanical section on the basis of the appearance information of the workpiece obtained by a visual sensor, etc., so as to hold and pick up the workpiece to be picked by a usual picking-up operation.

However, if another workpiece is at least partially superimposed on the workpiece to be picked, and when the workpiece to be picked is picked up while maintaining such a condition, the other workpiece superimposed on the workpiece to be picked may fall down and drop into the container or may be thrown out in the factory during a subsequent transferring operation. The dropping workpiece may collide with another workpiece, which may cause the damage of the workpieces or noise due to collision.

In the above situation, a conventional robot system generally performs a workpiece picking operation in such a way that the highest priority is placed on the safety of operators. Thus, when the visual sensor detects that another workpiece is at least partially superimposed on the workpiece to be picked, the system defers the picking-up operation on this workpiece to be picked, and tries to pick out another secondary workpiece to be picked, with which no workpiece overlaps. For example, Japanese Unexamined Patent Publication (Kokai) No. 9-91441 (JP-A-9-91441) discloses an interference detecting method, performed in an article picking system using a robot, in which an "interference" (i.e., contact, proximity, overlap) between an objective article to be picked and another article is detected by means of image processing.

However, in the above technique in which the picking operation for the workpiece to be picked but interfering with another workpiece is deferred, it may finally be impossible to pick up the deferred workpiece, depending on the superposition of the workpieces. In this case, all the workpieces lying under the deferred workpiece to be picked can never be picked up, and this may lead to the significant lowering of working efficiency.

SUMMARY OF THE INVENTION

It is an object of the present invention to provide an object picking system for picking up, one by one, a plurality of irregularly placed objects, which permits a picking operation on an object to be picked, on which another object is at least partially superimposed, to be performed without being deferred and in such a manner as to avoid the dropping of the object during the picking operation and the resulting damage of the object, and which thus can ensure a safe operation and prevent the lowering of the working efficiency.

To accomplish the above object, the present invention provides an object picking system comprising a detecting section detecting, as an image, an object to be picked, among a plurality of objects placed in a manner as to be at least partially superimposed on each other; a storage section storing appearance information of a predetermined portion of a reference object having an outward appearance identical to an outward appearance of the object to be picked; a determining section determining, in the image of the object to be picked detected by the detecting section, whether an inspected portion of the object to be picked, corresponding to the predetermined portion of the reference object, is concealed by another object, based on the appearance information of the reference object stored in the storage section; a control section deciding a picking motion for the object to be picked and outputting a control signal of the picking motion, based on a determination result of the determining section; and a picking mechanism performing the picking motion on the object to be picked in accordance with the control signal output from the control section.

In the above-described object picking system, the picking mechanism may comprise a robot mechanical section.

Also, when the determining section determines that the inspected portion of the object to be picked is concealed by another object, the picking motion decided by the control section may comprise a motion for tilting the object to be picked in a manner as to bring the inspected portion to be substantially lower, in the direction of gravity, than a remaining portion of the object to be picked.

Also, the picking mechanism may comprise a hand capable of holding the object to be picked; and the control section may select a type of the hand to be used when the picking mechanism performs the picking motion and instructs the type to the picking mechanism, based on the determination result of the determining section.

In this arrangement, the control section may decide a hold point of the object to be picked to be held by the hand and instruct the hold point to the picking mechanism, based on the determination result of the determining section.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
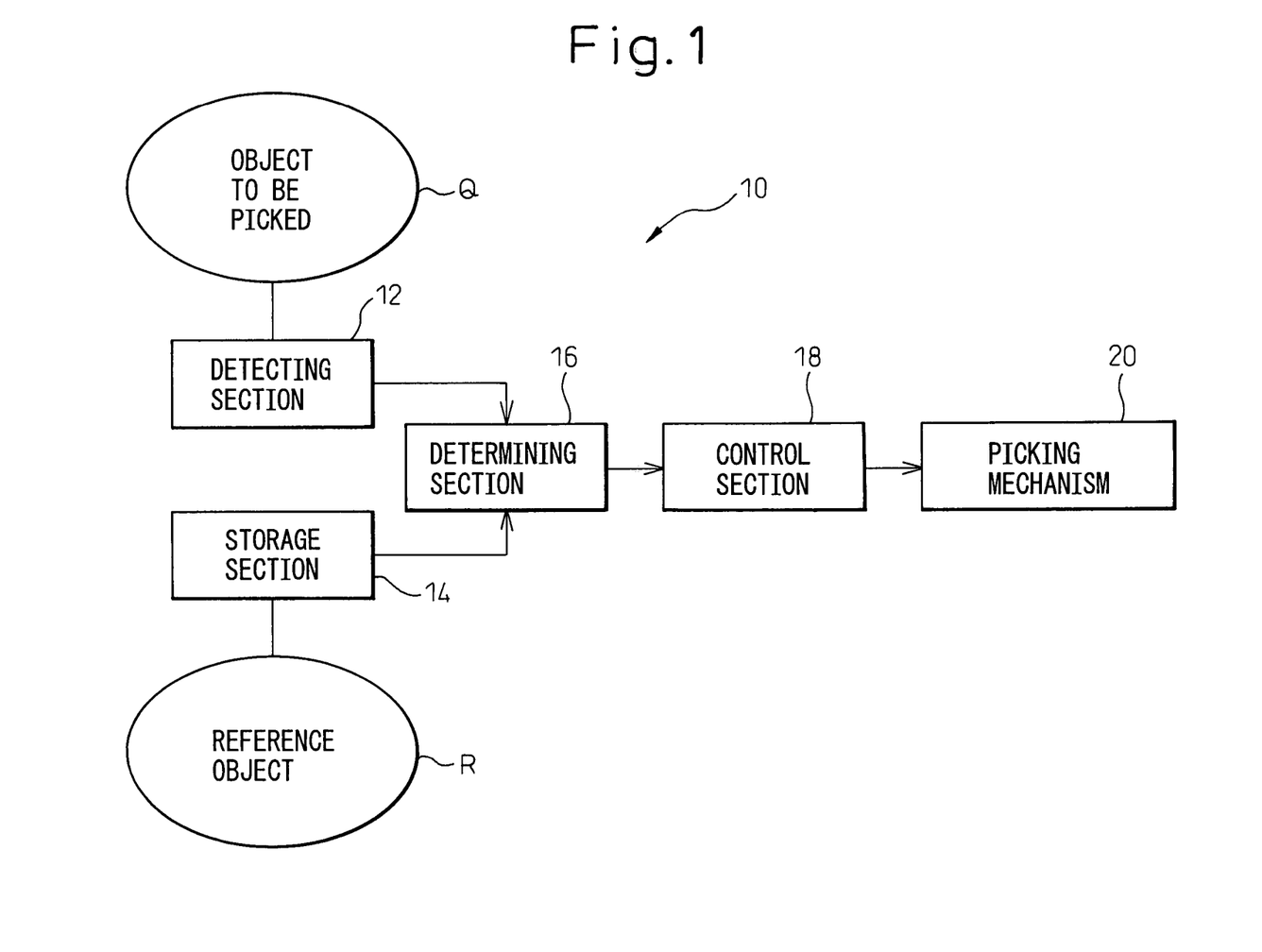
FIG. 1 is a block diagram showing the basic configuration of an object picking system according to the present invention.

Referring to the drawings, FIG. 1 shows the basic configuration of an object picking system 10 according to the present invention. The object picking system 10 includes a detecting section 12 detecting, as an image, an object "Q" required to be picked up (hereinafter referred to as an "object to be picked Q"), among a plurality of objects placed in a manner as to be at least partially superimposed on or overlap with each other; a storage section 14 storing the appearance information of a predetermined portion of an object "R" as a reference (hereinafter referred to as a "reference object R") that has an outward appearance identical to an outward appearance of the object to be picked Q; a determining section 16 determining, in the image of the object to be picked Q detected by the detecting section 12, whether an inspected portion of the object to be picked Q, corresponding to the predetermined portion of the reference object R, is concealed by another object, based on the appearance information of the reference object R stored in the storage section 14; a control section 18 deciding a picking motion for the object to be picked Q and outputting a control signal of the picking motion, based on the determination result of the determining section 16; and a picking mechanism 20 performing the picking motion on the object to be picked "Q", in accordance with the control signal output from the control section 18.

Figure 2:
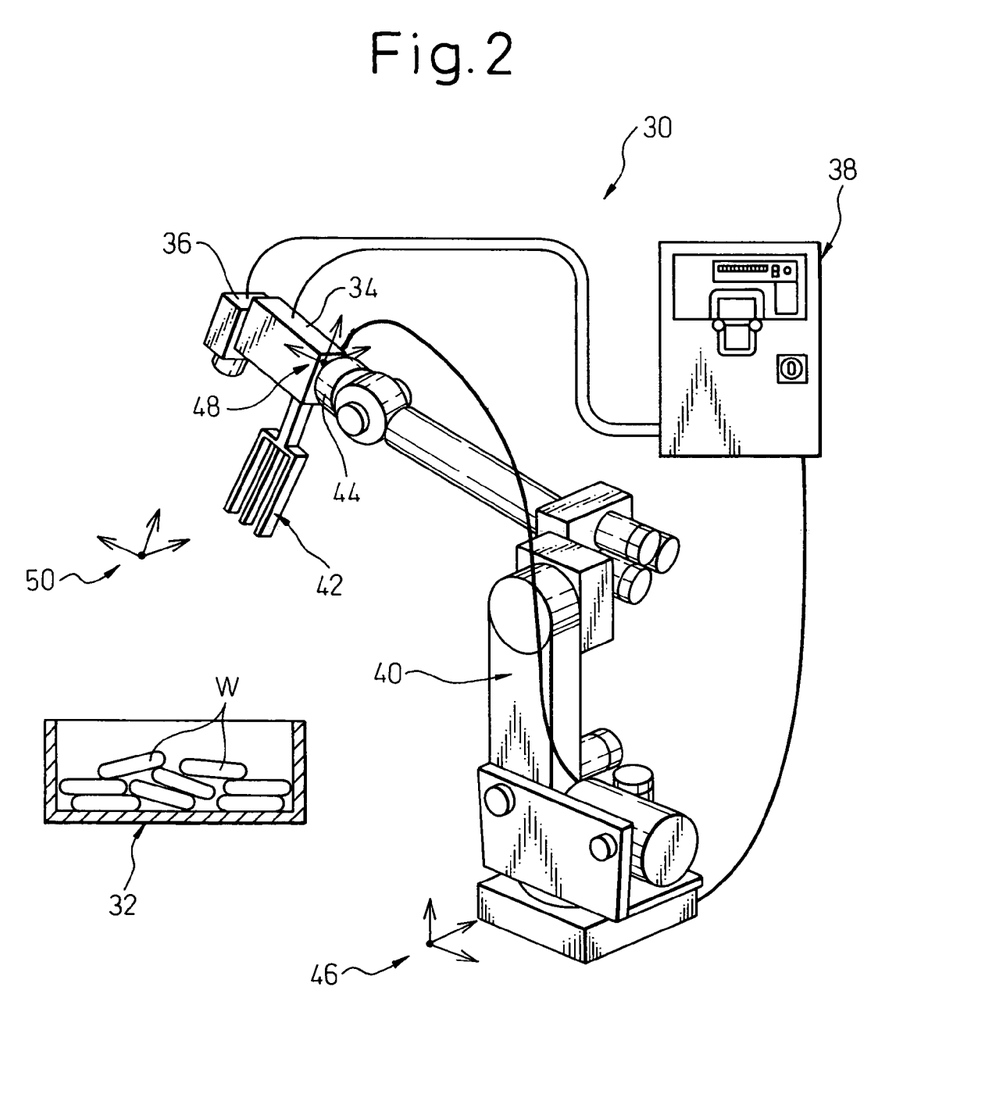
FIG. 2 is a schematic view typically showing the entire configuration of an object picking system, according to an embodiment of the present invention.

FIG. 2 typically shows the entire configuration of an object picking system 30 according to an embodiment of the present invention and having the above-described basic configuration. The object picking system 30 according to the illustrated embodiment is a robot system including a hand and a visual sensor, and is capable of picking up a plurality of workpieces W stacked irregularly and randomly in a basket-type container 32 one by one from the container 32. It should be noted that the term "hand" used in this application means an end-effector having a function for holding an object, such as a gripper, a universal hand, a suction hand, and so on.

The object picking system 30 includes a light projector 34 and a video camera 36 as the detecting section 12 (FIG. 1), both composing a sensor head section of a three-dimensional visual sensor, for detecting a workpiece W as the object to be picked Q (FIG. 1). The light projector 34 projects a slit-through light or a pseudo slit-through light onto the workpiece W as a reference light. The "pseudo slit-through light" refers to a light formed in the shape of a slit by scanning a spot light along a certain plane. The video camera 36 functions as a light receiver for detecting the reflected pseudo slit-through light of the reference light projected onto the workpiece W from the light projector 34. The video camera 36 is also used to obtain two dimensional characteristics of a measured object (i.e., the workpiece W).

The object picking system 30 is also provided with a robot controller 38 including the storage section 14, determining section 16 and control section 18 (FIG. 1), and a robot mechanical section 40, as the picking mechanism 20 (FIG. 1), which is connected to and controlled by the robot controller 38. As shown in the drawing, the light projector 34 and the video camera 36, both composing the sensor head section of a three-dimensional visual sensor, are attached to the flange portion 44 at the distal end of the arm of the robot mechanical section 40, together with the hand 42 as a tool or an end-effector. The robot controller 38 also functions as an image processing/control section of the three-dimensional visual sensor. Thus, the robot controller 38 is connected to the light projector 34 and the video camera 36, so as to execute the control of the light projection operation of the light projector 34 and of the image pick-up operation of the video camera 36, the acquisition and processing of an image picked up by the video camera 36, as well as various other processes as described later.

The robot mechanical section 40 is provided inherently with a base coordinate system (also referred to as a robot coordinate system) 46. Also, on a flange portion 44 at the distal end of the arm of the robot mechanical section 40, a mechanical interface coordinate system (also referred to as a flange coordinate system) 48 is provided, so as to be fixed to the flange portion 44. The position and orientation of a member in the flange coordinate system 48 is changed in the robot coordinate system 46 in association with the present position and orientation of the robot mechanical section 40. Therefore, data representing the position and orientation in these coordinate systems 46, 48 are convertible to each other at any time, by using suitable parameters stored in the memory of the robot controller 38.

In the above configuration, it is assumed that the calibration of the three-dimensional visual sensor has been completed and the data acquired in the calibration (i.e., the calibration data) are stored in the memory of the robot controller 38. The calibration data include data required to calculate a spatial location where the slit-through light projected from the light projector 34 onto the workpiece W forms a certain plane (i.e., a reference optical plane), data required to calculate the direction of the optical axis of the video camera 36, etc.

The sensor head section of the three-dimensional visual sensor is provided inherently with a sensor coordinate system 50. The flange coordinate system 48 and the sensor coordinate system 50 are configured to be related to each other with a conversion matrix [Sf] stored in the memory of the robot controller 38. The detection information based on the two dimensional and three-dimensional image processing, obtained by the video camera 36, is converted by the respective calibration data, and is output toward the robot controller 38 as data provided commonly in the sensor coordinate system 50. The specific procedure of the calibration and the method for obtaining the conversion matrix [Sf] are well known, and detailed explanation thereof is omitted.

Now, referring to FIGS. 3A to 7, the picking operation for a plurality of workpieces W contained to be irregularly and randomly stacked in the container 32, performed in the object picking system 30 composed of the above-described robot system with hand/visual sensor, will be described.

A model representing the workpiece W as a whole (hereinafter referred to as a "whole model") and a model representing a desired portion along the periphery of the workpiece W (hereinafter referred to as a "partial model") are previously taught to the robot controller 38. The previous teaching of the whole and partial models of the workpiece W is first described below with reference to FIGS. 3A and 3B.

In the previous teaching of the whole and partial models of the workpiece W, a certain single workpiece $W_R$ is first selected as the reference object R (FIG. 1) for teaching, from among a plurality of workpieces W, and is placed at a suitable position where the whole workpiece $W_R$ is caught within the field of view of the video camera 36. Then, an image pick-up operation is performed by the video camera 36 under the control of the robot controller 38, and a two-dimensional image as shown, e.g., in FIG. 3A (an elliptical shape) is acquired. The robot controller 38 performs an image processing operation on the acquired two-dimensional image, and stores data (i.e., appearance information) related to a single whole model M (i.e., an image inside a rectangular region defined by a broken line) and several (two, in the drawing) partial models m1, m2 (i.e., images inside rectangular regions defined by broken lines) in the memory (or the storage section 14 (FIG. 1)).

The data to be stored include the shape information of each model M, m1, m2; the position and the orientation (or the rotation angle) of the whole model M in the image; and the relative positional relationship of the whole model M and each partial model m1, m2 in the image. For example, in FIG. 3A, the positions and the directions (as represented by rotation angles with respect to a given coordinate axis in the image) of the origin P0 of the whole model M (which is a desired point representative of the position of the whole model M; e.g., the center of gravity of the workpiece W in the image (e.g., a predetermined value)) and of the origin P1, P2 of each partial model m1, m2 (which is a desired point representative of the position of each partial model m1, m2; e.g., the center of gravity of a part of the workpiece W corresponding to each partial model m1, m2 in the image (e.g., a predetermined value, but a point other than the center of gravity is adopted in the drawing) are stored as the appearance information.

Figure 3A:
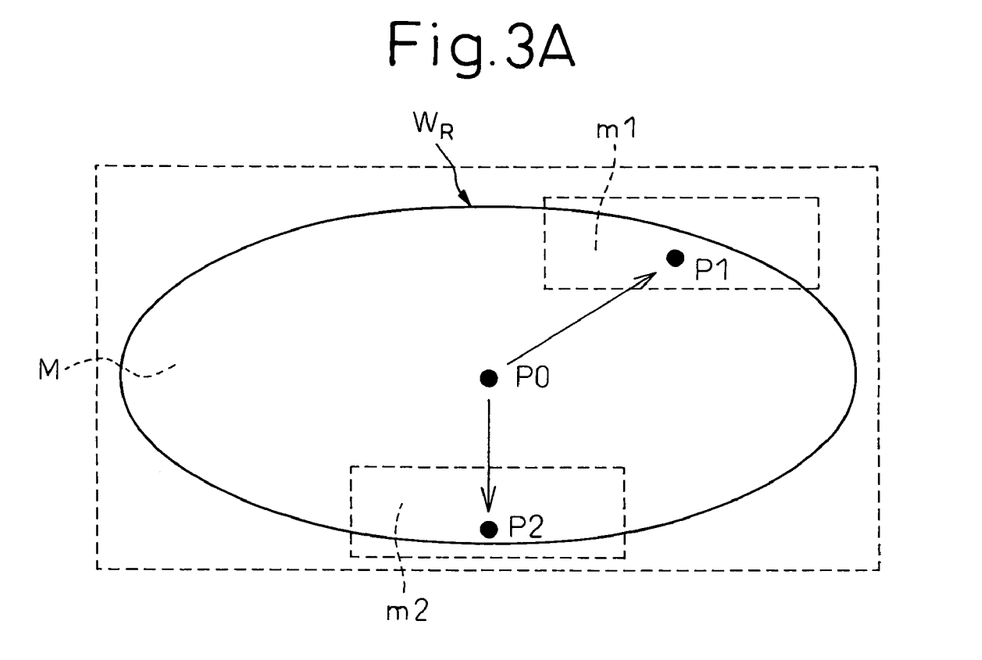
FIG. 3A is a view showing an example of a previous teaching of whole and partial models of a workpiece to be picked, in the object picking system of FIG. 2.
Figure 3B:
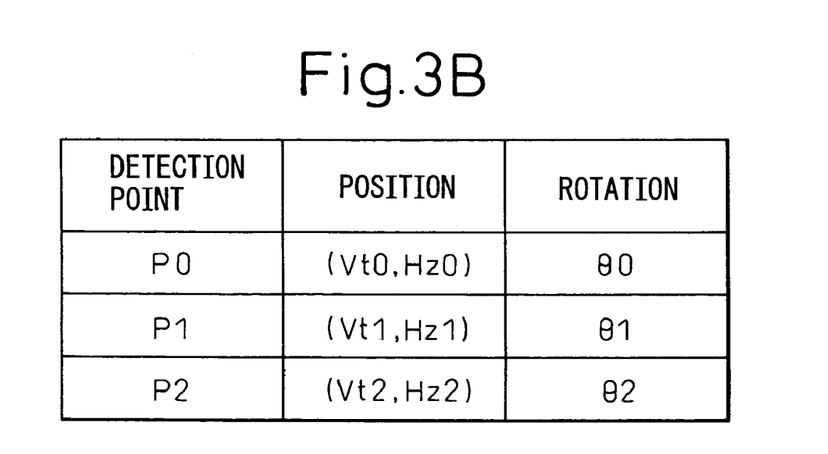
FIG. 3B is a view showing a table of the positional relationship between the origins of the whole and partial models of FIG. 3A.

FIG. 3B shows, in the form of a table, the example of the stored data, i.e., the data of the positions and rotation angles of the origin P0 of the whole model M and of the origins P1, p2 of the partial models m1, m2. In this connection, the number of the partial models m taught by the above-described procedure is not limited to two, but any number of partial models may be used.

Figure 4:
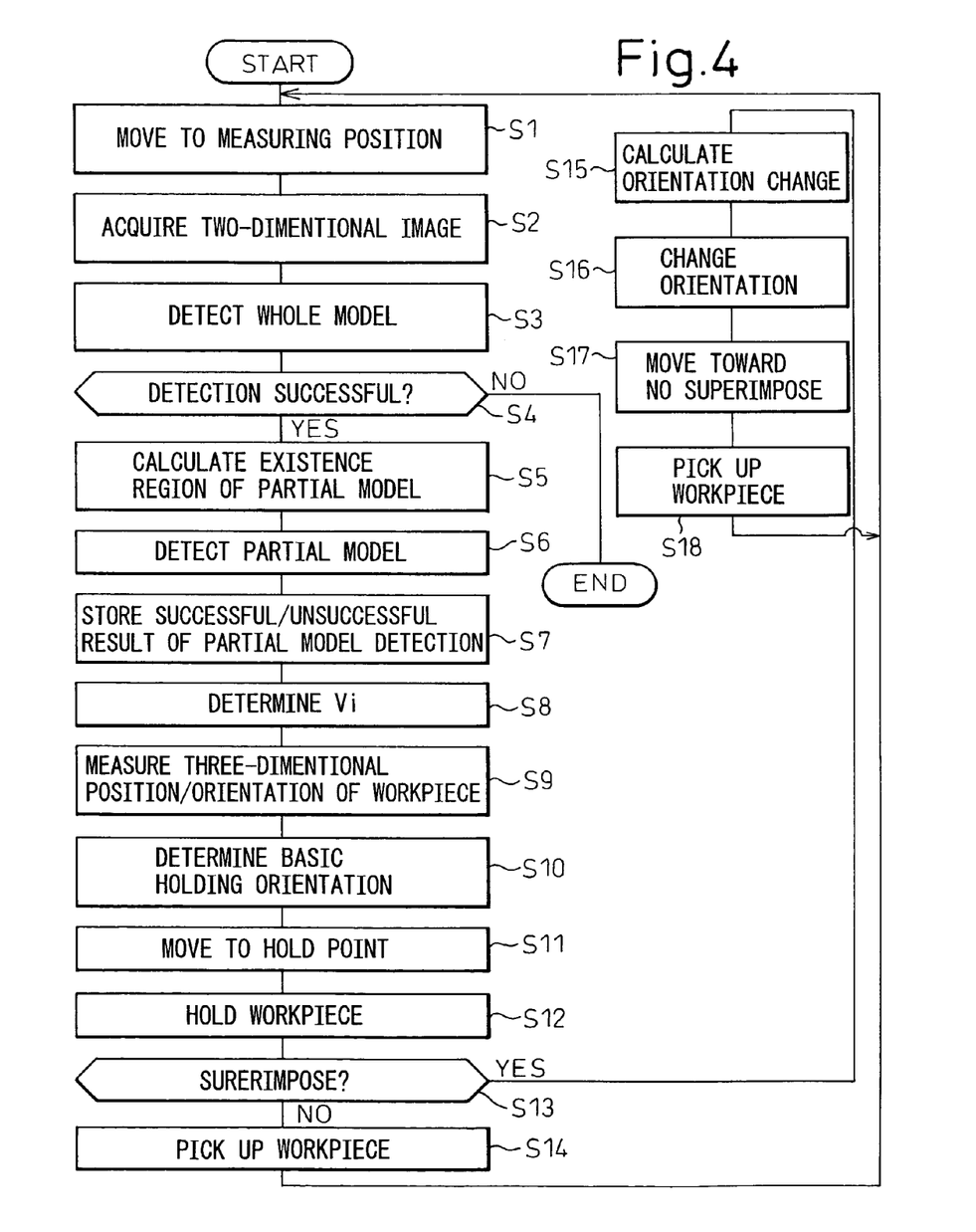
FIG. 4 is a flow chart showing an object picking procedure carried out by the object picking system of FIG. 2.

The picking operation for the workpiece W, conducted by the object picking system 30, will be described below, by following several steps in a flow chart of FIG. 4 which shows a processing flow in the robot controller 38 relating to the motion of the robot mechanical section 40 and the calculating procedure.

Step S1: The robot mechanical section 40 is moved to a measuring position. The measuring position is a previously taught position, such as a position above the center of the container 32 containing a plurality of workpieces W, where the image of several workpieces W can be captured in the field of view of the video camera 36.

Step S2: An image pick-up operation is performed by the video camera 36 at the measuring position, and a two-dimensional image of several workpieces W is acquired.

Step S3: The acquired two-dimensional image is processed, so as to try to detect the image of a workpiece W corresponding to the whole model M (i.e., a workpiece $W_O$ to be picked up (FIG. 5)). For the detection of the image corresponding to the whole model M, a template matching method, for example, can be adopted, in which the whole model M is used as a template. The detection procedure of the image corresponding to the whole model using the template matching method is well known, and therefore, a detailed explanation thereof is omitted.

Step S4: If the detection at step S3 is unsuccessful, it is determined that there is no workpiece W in the container 32, and thus the process is terminated. If the detection at step S3 is successful, the process proceeds to step S5.

Step S5: In the image of the workpiece $W_O$ corresponding to the whole model M, regions in which the portions of the workpiece corresponding respectively to the partial models m1, m2 (i.e., inspected portions) can be included (usually, regions defined by the rectangular regions shown in FIG. 3A plus predetermined margins: hereinafter referred to as "existence regions") are calculated. In this step, reference is first made to the data of the position and rotation of the whole model M as previously taught (FIG. 3B), so as to estimate the deviation of the position and orientation of the workpiece $W_O$, corresponding to the whole model M, from the whole model M in the image. Then, on the basis of the estimated deviation of the position and orientation of the workpiece $W_O$ as well as the data of the position and rotation of the partial models m1, m2 as previously taught, the existence regions n1, n2 of the workpiece portions corresponding respectively to the partial models m1, m2 (i.e., rectangular regions shown by broken line in FIG. 5) are calculated.

Step S6: In the existence regions n1, n2 calculated at step S5, the detection of each of the workpiece portions (i.e., inspected portions) corresponding respectively to the partial models m1, m2 is tried.

Figure 5:
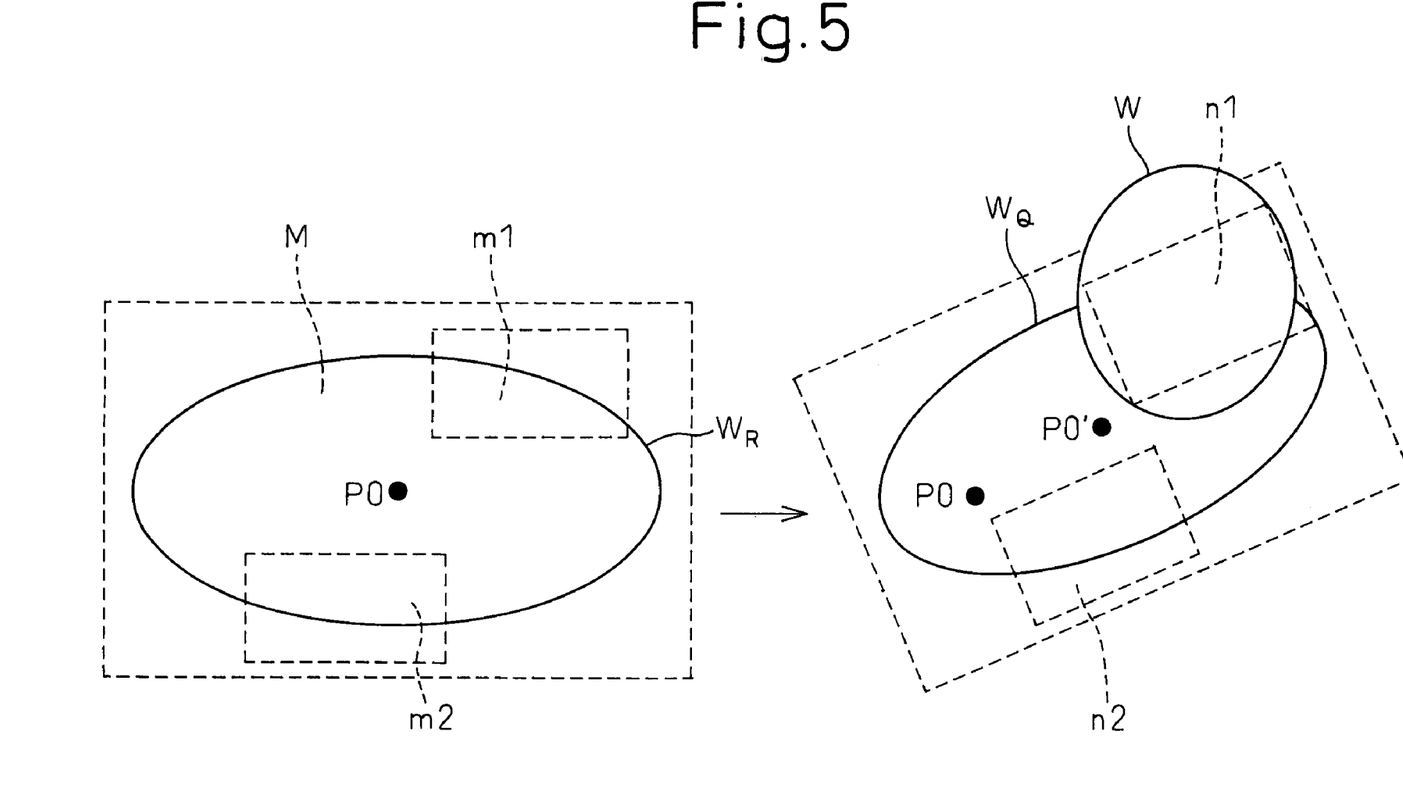
FIG. 5 is a view showing an exemplary condition wherein another workpiece is partially superimposed on an actual workpiece to be picked, in association with the whole and partial models.

Step S7: The successful/unsuccessful result of the detection of each of the workpiece portions corresponding to the partial models m1, m2 is stored. In this connection, a "successful detection" means that there is no other workpiece superimposed on or overlapping with the workpiece portion, and an "unsuccessful detection" means that another workpiece is superimposed on or overlaps with the workpiece portion. For example, in the case where, as shown in FIG. 5, the workpiece portion corresponding to the partial model m2 is detected in the existence region n2 but the workpiece portion corresponding to the partial model m1 is not detected in the existence region n1, it can be determined that, in the workpiece $W_O$ corresponding to the whole model M detected at step S3, the workpiece portion corresponding to the partial model m1 is concealed by another workpiece W. It should be noted that FIG. 5 represents in the same screen the image of the whole model M as previously taught and the image of the workpiece $W_O$ as actually detected, so as to permit the positions and orientations thereof to be compared. In the image of the workpiece $W_O$, P0 denotes the origin of the whole model M, and P0' denotes the origin of the workpiece $W_O$ corresponding to P0.

Step S8: A vector Vi (i=1, 2, in this embodiment) from the origin P0' of the workpiece $W_O$ corresponding to the whole model M to the origin of each of the workpiece portions corresponding respectively to the partial models m1, m2, is determined in the sensor coordinate system 50 (FIG. 2). In this connection, Vi is two-dimensional information that contains no depth information, and therefore, in the sensor coordinate system 50, the Z component=0.

Until the above step S8, the procedure in which, using the whole model M and the partial models m1, m2, the workpiece $W_O$ corresponding to the whole model M is first detected, and thereafter, based on the detection result, the workpiece portions corresponding to the partial models m1, m2 (or the inspected portions) are detected. However, it is also possible to detect the workpiece $W_O$ corresponding to the whole model M later, or to use no whole model M. For example, only a plurality of partial models may be stored, and one of them may be used as a reference model like the above-described whole model.

Also, in place of the above procedure in which the workpiece portion corresponding to a reference model is first detected and thereafter, based on the detection result, the workpiece portions corresponding to the other models are detected, an alternative procedure may be adopted in which workpiece portions corresponding to all the models are individually detected. In this configuration, it is possible to compare the relative positional relationship between all the models as previously taught with the relative positional relationship between corresponding workpiece portions, and thus to determine whether each of the models is concealed.

Step S9: Regarding the workpiece $W_O$ corresponding to the whole model M (i.e., the workpiece to be picked at the present procedure), the three-dimensional position/orientation of an entire workpiece is measured using the three-dimensional visual sensor, so as to acquire data thereof. The acquired data of the position and orientation of the workpiece $W_O$ as a whole are expressed by a matrix [Wa] and stored in the memory (the storage section 14 (FIG. 1)). [Wa]=[Na, Oa, Aa, Pa], wherein Na, Oa, Aa, Pa are normal vector, orientation vector, approach vector, and position vector, respectively.

Step S10: The orientation of the hand 42 such that the above-described approach vector Aa coincides with "the direction of tool" (i.e., the direction in which an end effector exerts action on the workpiece: in the illustrated embodiment, the direction in which the hand 42 (FIG. 2) approaches the workpiece W) is stored as a basic holding orientation.

Step S11: While maintaining the hand 42 at the basic holding orientation, the robot mechanical section 40 is moved to a holding position (i.e., the position at which the hand 42 is operated to open or close).

Step S12: The hand 42 is closed, so as to hold the workpiece $W_O$. The portion to be held (or the hold point) on the workpiece $W_O$ can be previously taught.

Step S13: If the detection result stored at step S7 shows that both the workpiece portions corresponding to the partial models m1, m2 are successfully detected, the process proceeds to step S14. If at least one of the workpiece portions corresponding to the partial models m1, m2 is not successfully detected, the process proceeds to step S15.

Step S14: The robot mechanical section 40 is controlled, so as to lift the workpiece $W_O$ held at step S12, while maintaining the hand 42 at the basic holding orientation, and to transfer the workpiece $W_O$ to a location designated by a program, and then the process returns to step S1. If both the workpiece portions corresponding to the partial models m1, m2 are successfully detected, it is determined that there is no other workpiece superimposed on or overlapping with the workpiece $W_O$ to be picked up. Consequently, it is possible to consider that, even if the workpiece $W_O$ is lifted at the basic holding orientation of the hand, problems such as the dropping of workpiece or the like would not happen.

Step S15: The detail of change in the orientation of the hand 42 is determined by calculation. If at least one of the workpiece portions corresponding to the partial models m1, m2 is not successfully detected, it is determined that another workpiece is superimposed on or overlaps with the workpiece $W_O$ to be picked up. Thus, when the workpiece $W_O$ is lifted at the basic holding orientation of the hand, the other workpiece superimposed on or overlapping with the workpiece $W_O$ to be picked up may drop into the container 32 (FIG. 2) or may be thrown out in the factory during the transfer. Therefore, the picking-up of the workpiece $W_O$ is performed after changing the orientation of the hand 42.

Figure 6A:
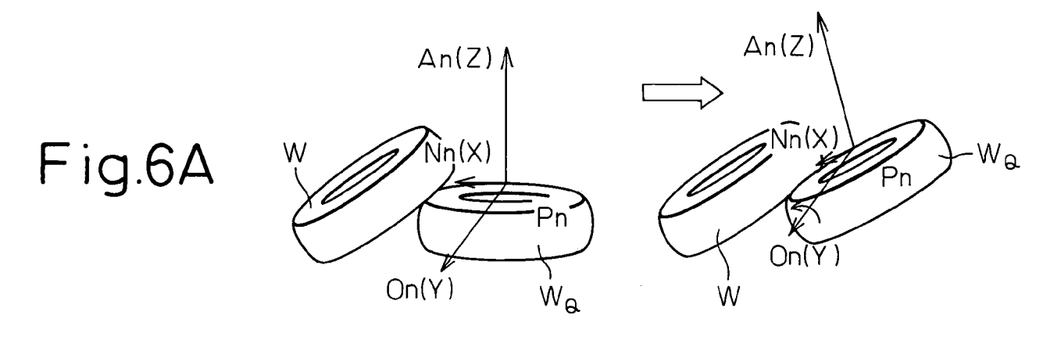
FIG. 6A is a view schematically explaining a technique for picking the workpiece to be picked having another workpiece superimposed thereon.
Figure 6B:
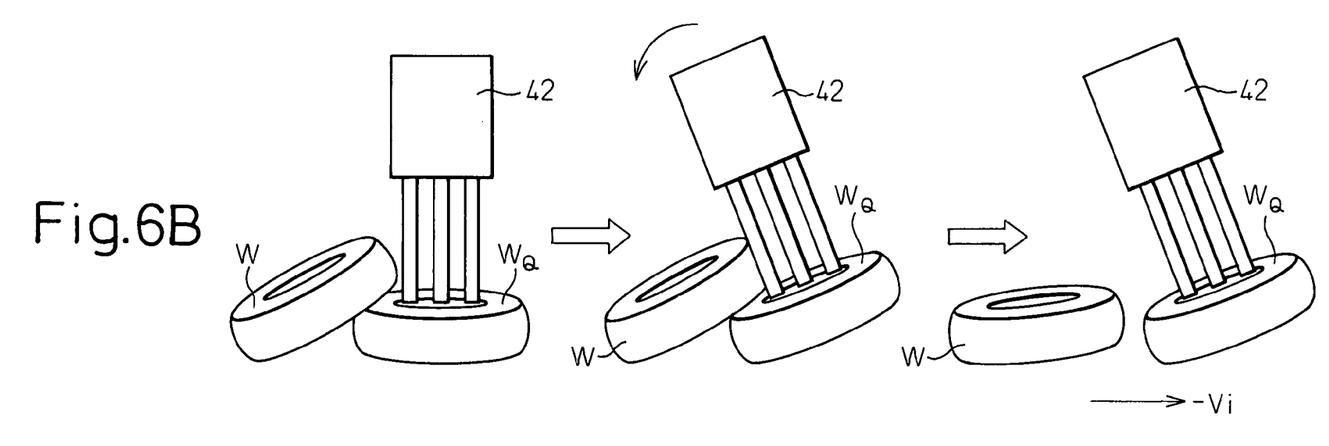
FIG. 6B is a view explaining the picking technique of FIG. 6A, performed in the object picking system of FIG. 2.

For example, as shown in FIGS. 6A and 6B, a technique may be adopted in which the workpiece $W_O$ is picked up in an oblique fashion by tilting the hand 42 in a direction selected with reference to the position at which the other workpiece is superimposed. The direction in which the hand 42 is to be tilted can be determined, as shown in FIG. 6A, such that, with respect to the basic holding orientation (corresponding to the direction of the approach vector Aa), the portion of the workpiece $W_O$ on which the other workpiece W is superimposed or overlaps, or at which the workpiece portion (or the inspected portion) corresponding to the partial model is not detected, is brought to be substantially lower, in the direction of gravity, than a remaining portion of the workpiece $W_O$. In this configuration, the amount of tilting of the hand 42 can be stored as a predetermined value for each partial model.

Step S16: In accordance with the calculation result at Step S15, the orientation of the hand 42 is changed from the basic holding orientation to a tilted orientation.

Step S17: The robot mechanical section 40 is moved in a manner that the portion of the workpiece $W_O$ on which no other workpiece W is superimposed or overlaps, or at which no partial model exists for which the corresponding workpiece portion (or the inspected portion) is not detected, is directed as a leading end. In this configuration, the hand 42 may be shifted by, e.g., a shifting amount −Vi which is reversed in the direction thereof from the above-described vector Vi. FIG. 6B shows the motion of the hand 42 at steps S16 and S17.

Alternatively, it is possible to calculate the position and orientation [Wb]=[Nb, Ob, Ab, Pb] of the hand 42 at the time of being tilted, as well as the position and orientation [Wc]=[Nc, Oc, Ac, Pc] of the hand 42 at the time when the workpiece $W_O$ is picked up in the oblique fashion, on the basis of the data [Wa] of the position and orientation of the hand 42 at the time of holding the workpiece $W_O$ at the basic holding orientation (corresponding to the position and orientation of the workpiece $W_O$), and thereby to shift the hand 42 from the basic holding orientation to [Wb] and [Wc] in sequence. Specific calculation procedure is described below.

First, a new coordinate system [Wn]=[Nn, On, An, Pn] is defined as follows:

$An = Aa$ $On = (An \times ([Uf]*[Sf]*Vi))/\|An \times ([Uf]*[Sf]*Vi)\|$ $Nn = On \times An$ $Pn = Pa$ In this connection, [Uf] is a matrix representing the position and orientation of the flange coordinate system 48 (FIG. 2) during an operation for detecting the image of the workpiece, "×" is an operator representing the vector product, and "*" is an operator representing the product.

In the above coordinate system [Wn], Y-axis is defined as the rotation axis. Therefore, when a coordinate transformation carried out through an α-degree rotation about Y-axis is represented by Rot[Y, α], the following equation is given:

$[Wb] = [Wn]*Rot[Y, \alpha]*Inv[Wn]*[Wa]$ wherein Inv[Wn] represents the inverse matrix of [Wn]. As for [Wc], when the equation $[Wm] = [Wn]*Rot[Y, \alpha] = [Nm, Om, Am, Pm]$ is defined, the calculation is made as follows:

$Nc = Nb$ $Oc = Ob$ $Ac = Ab$ $Pc = Pb - \beta * Nm$ ($\beta$ is a picking amount)

Step S18: The robot mechanical section 40 is controlled so as to lift the workpiece $W_Q$ held by the hand 42, and to transfer the workpiece $W_Q$ to a location designated by a program. Then, the process returns to step S1.

In the above-described workpiece picking operation, the picking procedure is adopted, in which the hand 42 (or a tool) is tilted so as to pick out the workpiece $W_Q$ in a oblique fashion. However, the picking procedure can be modified, depending on the shape of the workpiece $W_Q$, or the arrangement of the workpiece $W_Q$ in the container 32. For example, if the picking-up of the workpiece $W_Q$ may result in a mutual interference between the container 32 and the hand 42, other procedures may be adopted such that the workpiece $W_Q$ is temporarily held by the hand 42 at the basic holding orientation, and thereafter the hand 42 is slowly rotated about its axis to throw off the workpiece W superimposed on or overlapping with the workpiece $W_Q$ and then lift the workpiece $W_Q$, or the hand 42 is operated more slowly than a usual picking speed so as to reduce a shock due to the possible dropping of the workpiece $W_Q$, or the hand 42 is first moved at the basic holding orientation to a position where no interference with the container 32 is likely to happen and then the hand 42 is tilted, or the like.

At steps S11 and S12 in the above-described workpiece picking operation, it may happen that the predetermined portion to be held (or the hold point) of the workpiece $W_Q$ is concealed by another workpiece. In order to deal with this problem, it is advantageous that the portion to be held is provided in several important check portions in the template matching of the detected workpiece image with the whole model, or that the portion to be held is provided as one of the partial models as previously taught. The former approach will be described below with reference to FIG. 7.

Figure 7:
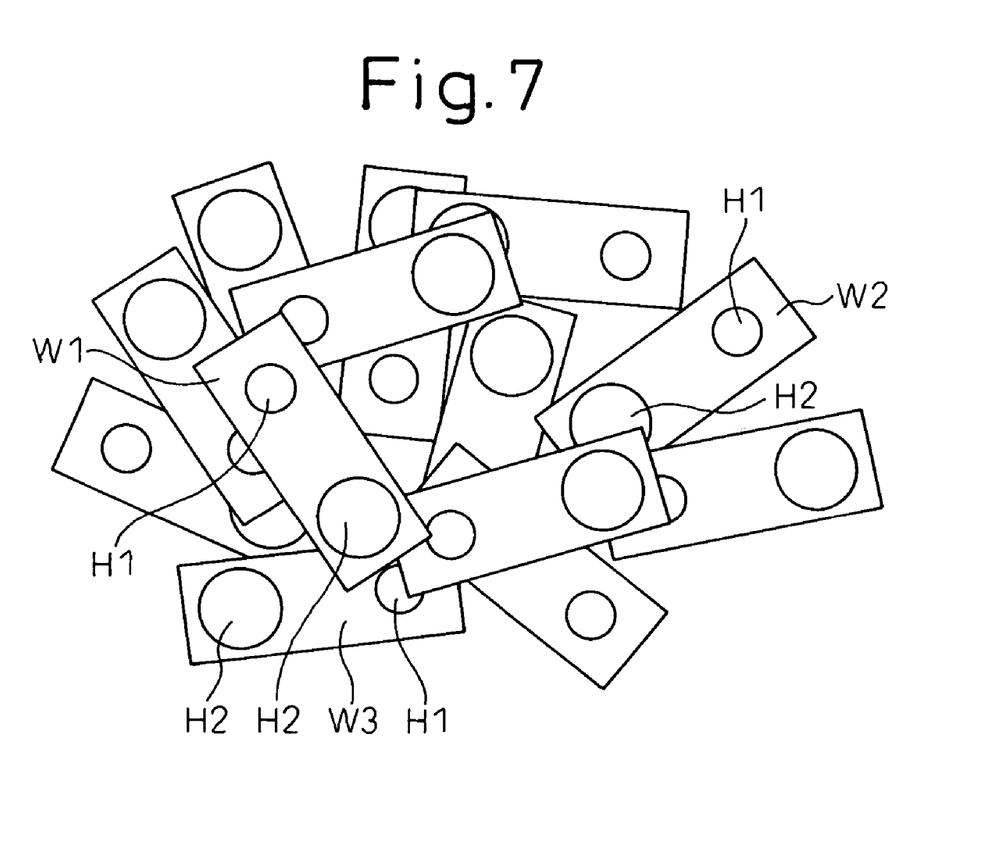
FIG. 7 is a view showing a plurality of workpieces at least partially superimposed on each other, which can be picked up by the object picking system of FIG. 2.

FIG. 7 is a top plan view showing a plurality of workpieces W1, W2, W3, . . . , each provided with two holes H1 and H2 of different sizes, stacked irregularly and randomly. When the workpiece having the above configuration, such as a mechanical component having holes, is to be held, it has been generally performed to insert fingers of the hand 42 (FIG. 2) into the hole H1 or H2 of the workpiece and to shift the fingers so as to exert outward pressure from inside the hole. In order to conduct the workpiece picking operation on such workpieces after detecting the mutual concealing of the workpieces, whole and partial models are first taught in the same way as in the above-described operation example.

As the partial model to be taught, for example, the partial model m1 (FIG. 3A) may be defined as a "region including the hole H1", and the partial model m2 (FIG. 3A) may be defined as a "region including the hole H2". As a result, in the same way as in the above-described operation example, it is possible to determine whether the holes H1, H2 of the workpiece corresponding to the whole model is concealed by another workpiece, in accordance with the successful or unsuccessful result of the detection of the partial models m1, m2.

Therefore, if a workpiece W1 having both holes H1, H2 exposed is detected in the template matching with the whole model, the workpiece W1 may be picked up first. However, there may be a case where the workpiece W1 is not detected for some reason. In this case, the other workpieces W2, W3 with only one hole concealed are detected in the template matching, and the holding and picking of the workpieces W2, W3 is first carried out. In the illustrated example, two types of hands suitably applied to hold the larger hole H2 and the smaller hole H1, respectively, are previously provided, and the hand applicable to the unconcealed one of holes in the detected workpiece is selected, so as to carry out the holding motion of the hand on the unconcealed hole, and thereby to perform the workpiece picking operation.

More specifically, in the case where the workpiece W2 is detected as the workpiece to be picked, the hand for holding the smaller hole H1 is selected, and the holding motion on the hole H1 is instructed, so as to perform the holding and picking of the workpiece W2. Also, in the case where the workpiece W3 is detected as the workpiece to be picked, the hand for holding the larger hole H2 is selected, and the holding motion on the hole H2 is instructed, so as to carry out the holding and picking of the workpiece W3. In this connection, the selection of a hand can be implemented by mounting a double-hand provided with two types of hands to the robot mechanical section and switching the orientation of the robot mechanical section or the double hand. Alternatively, the selection of a hand can also be implemented by using an automatic tool changer, so as to mount different hands to the robot mechanical section as required. If the two holes H1, H2 of the workpiece in FIG. 6 can be held by the same hand, depending on the state of concealing of holes in the detected workpiece, the holding of unconcealed hole may be instructed so as to carry out the workpiece picking operation.

While the invention has been described with reference to specific preferred embodiments, it will be understood by those skilled in the art that various changes and modifications may be made thereto without departing from the spirit and scope of the following claims.

The invention claimed is:

1. An object picking system comprising:
   a detecting section detecting, as an image, an object to be picked, among a plurality of objects placed in a manner as to be at least partially superimposed on each other;
   a storage section storing appearance information of a predetermined portion of a reference object having an outward appearance identical to an outward appearance of said object to be picked;
   a determining section determining, in said image of said object to be picked detected by said detecting section, whether an inspected portion of said object to be picked, corresponding to said predetermined portion of said reference object, is concealed by another object, based on said appearance information of said reference object stored in said storage section;
   a control section deciding a picking motion that is performed while holding said object to be picked and outputting a control signal of said picking motion, based on a determination result of said determining section; and
   a picking mechanism for grasping said object to be picked in a basic holding orientation and then performing said picking motion while holding said object to be picked in accordance with said control signal output from said control section;
   wherein, if said determining section determines that said inspected portion is not concealed by another object, said control section decides said picking motion such that said picking mechanism picks the object by maintaining the basic holding orientation defined at a time when said picking mechanism holds the object, and if said determining section determines said inspected portion is concealed by another object, said control section decides said picking motion such that said picking mechanism picks the object by changing said basic holding orientation.

2. An object picking system as set forth in claim 1, wherein said picking mechanism comprises a robot mechanical section.

3. An object picking system as set forth in claim 1, wherein, when said determining section determines that said inspected portion of said object to be picked is concealed by another object, said picking motion decided by said control section comprises a motion for tilting said object to be picked in a manner as to bring said inspected portion to be substantially lower, in a direction of gravity, than a remaining portion of said object to be picked.

4. An object picking system as set forth in claim 1, wherein said picking mechanism comprises a hand capable of holding said object to be picked; and wherein said control section selects a type of said hand to be used when said picking mechanism performs said picking motion and instructs said type to said picking mechanism, based on said determination result of said determining section.

5. An object picking system as set forth in claim 4, wherein said control section decides a hold point of said object to be picked to be held by said hand and instructs said hold point to said picking mechanism, based on said determination result of said determining section.

* * * * *